Patented June 24, 1924.

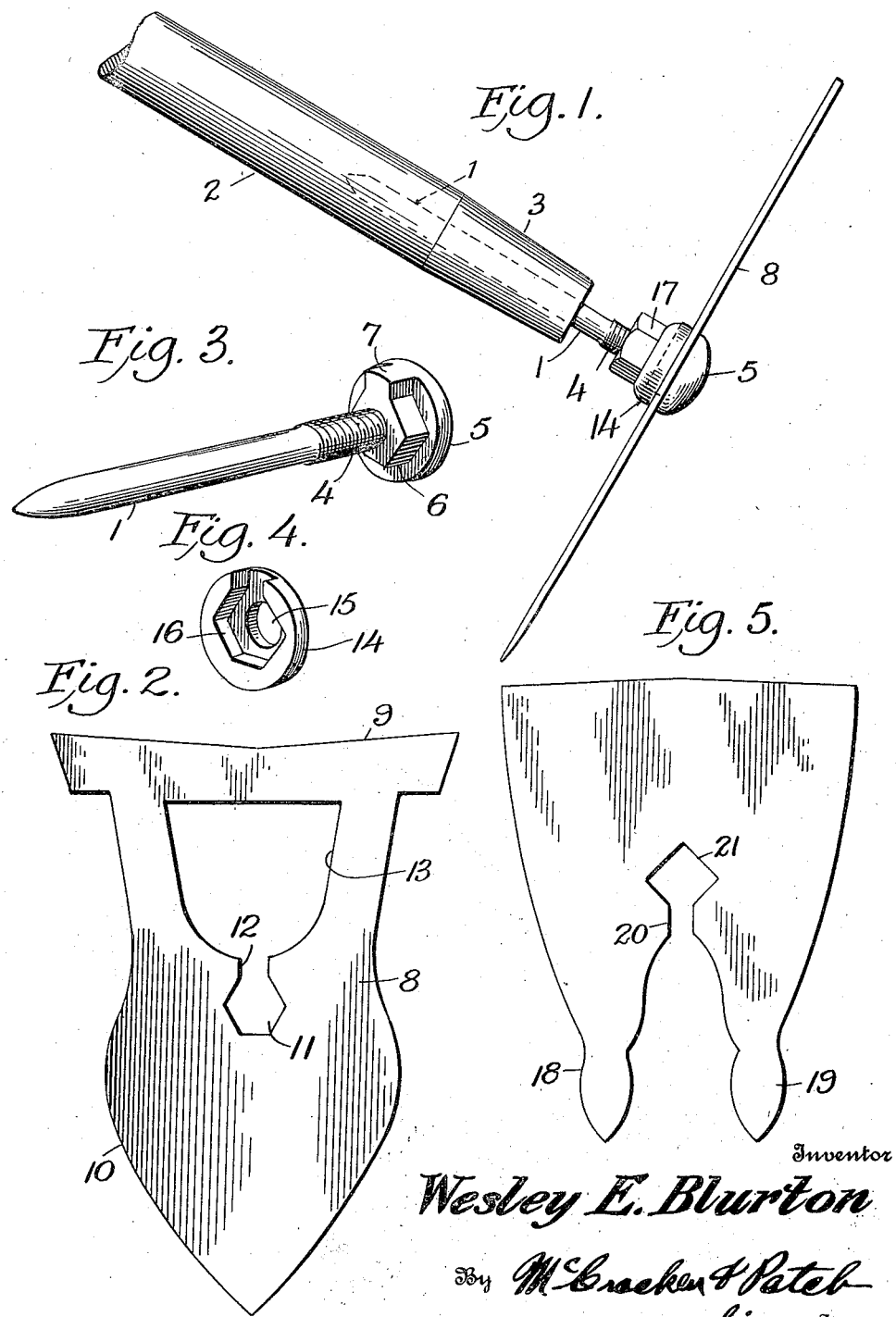

1,498,830

UNITED STATES PATENT OFFICE.

WESLEY E. BLURTON, OF FRENCH, IDAHO.

HOE.

Application filed September 6, 1921. Serial No. 498,640.

*To all whom it may concern:*

Be it known that I, WESLEY E. BLURTON, citizen of the United States, residing at French, in the county of Payette and State of Idaho, have invented certain new and useful Improvements in Hoes, of which the following is a specification.

This invention pertains to hoes, and particularly to a hoe structure adapted for weeding and cultivating.

An object is to provide a hoe including detachable blades to be made of different types and to be interchangeably fitted to suit varying conditions in use.

A further object resides in so constructing the holding means for the blades that no loose parts are included which might be lost either in the use of the hoe or when changing blades.

A still further object lies in so constructing the blade and the holding means that the blade is readily placed in position or removed when the holding means is released, and that the blade is securely clamped and is positively held against twisting or other movement when the holding means is tightened.

With these and other objects in view which will be apparent from the drawings, specification and claim, this invention includes certain novel features of construction and combinations of parts which will now be set forth.

In the drawings:

Figure 1 is a view in elevation of a hoe constructed in accordance with my invention.

Fig. 2 is a front view of one form of blade.

Fig. 3 is a view in perspective of the blade holding shank.

Fig. 4 is a perspective view showing the inner side of the blade clamping washer.

Fig. 5 is a view in elevation illustrating another form of blade.

The holding means includes a shank 1 which will be set in the end of a handle 2, a ferrule 3 being provided on the end of the handle if desired. This shank 1 is increased in diameter adjacent its outer end and is threaded in this enlarged portion as at 4. A head 5 is formed on the end of the shank 1 and a shoulder 6 of polygonal form is provided on the inner face of the head around the shank. This shoulder portion is made four-sided, six-sided, or of any other desired polygonal form, and has an extension 7 at one side terminating at the periphery of the head 5.

The blade 8 is made with a cutting edge 9 and a cultivating point 10, or of any other desired form, and in its middle portion has a polygonal opening 11 shaped to conform substantially to shoulder 6, a slot 12 connecting with and extending from one side of the opening. This slot 12 opens into an orifice 13 of sufficient size to freely admit passage of the head 5, and the slot 12 is sufficiently wide to allow shank 1 to pass laterally therethrough.

A clamping washer 14 is provided with a central opening 15 to slide over the threaded portion 4 of shank 1 and is recessed at 16 on its inner face to receive shoulder 6 and extension 7 of the head 5. A clamping nut 17 is provided to be turned onto the threaded portion 4 of shank 1 to bear against clamping washer 14.

In assembling the parts, the washer 14 and nut 17 are fitted upon the shank 1 and the shank is then set in the handle 2 substantially as shown in Fig. 1. When the blade is to be adjusted for use the head 5 is placed through orifice 13 in the blade and the shank is moved down through the slot 12 after which the blade is positioned with shoulder 6 received in opening 11 and extension 7 filling slot 12. Washer 14 is then brought down against the blade with recess 16 receiving the shoulder portion 6 and the extension 7, and when nut 17 is tightened down against this washer the blade is securely clamped and is rigidly held against displacement or lateral shifting or turning, and against twisting around the shank.

Where the blade is made as shown in Fig. 5 and two cultivating prongs 18 and 19 are provided, the slot 20 from the polygonal opening 21 opens into the space between the prongs and it is not therefore necessary to provide the orifice 13, as shown in Fig. 2. In this disclosure I have also shown opening 21 as four-sided, and it will be appreciated that this opening might be of other polygonal shapes and perhaps round.

By constructing the blade holding means in the manner set forth so that the head 5 is at the outer end of the shank, and washer 14 and nut 17 are placed upon the shank previous to fitting the same to the handle, this washer and nut are positively held against displacement, and these parts can not be lost when in use, or when being loosened from or tightened upon a blade. Also, by recessing the washer to receive the shoulder of the head this washer is held against rotation on the shaft when in the clamping position, and the washer thus acts as a lock washer for clamping nut 17, obviating the possibility of this nut being loosened while the hoe is in use.

While in the foregoing I have described specific embodiments, and have mentioned only certain possible modifications, it will be appreciated that in practice I do not limit myself to such specific details as herein set forth, but may resort to any practical modifications falling within the scope of the invention as defined in the appended claim.

I claim:—

A hoe including with a shank set in a handle to extend therefrom and terminating in an enlarged head at its end, said shank being screw-threaded adjacent the head, a polygonal shoulder formed on the inner face of the head of less diameter than the head and greater size than the shank and having a lateral extension, a blade provided with an opening of polygonal form corresponding to the shoulder and having a lateral slot of sufficient for passage of the shank, a clamping washer recessed on its face to correspond with the shoulder of the head and said lateral extension slidably fitted on the shank, and a nut fitted on the shank to be turned onto the threaded portion thereof to bear against the clamping washer.

In testimony whereof I affix my signature.

WESLEY E. BLURTON.